April 14, 1925.

R. H. DUNLAP 1,533,399

MEANS FOR TRANSMITTING POWER

Filed Feb. 6, 1920

3 Sheets-Sheet 1

Inventor,
Robert H. Dunlap.
E.W. Anderson & Son
By
Attorneys

April 14, 1925.
R. H. DUNLAP
1,533,399
MEANS FOR TRANSMITTING POWER
Filed Feb. 6, 1920
3 Sheets-Sheet 2
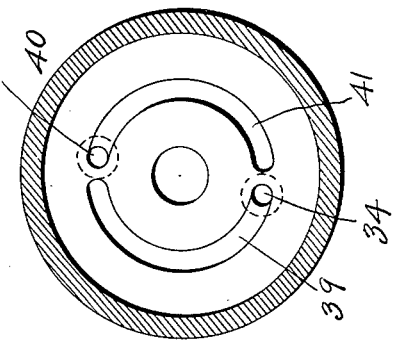
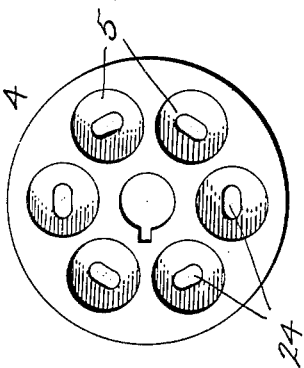
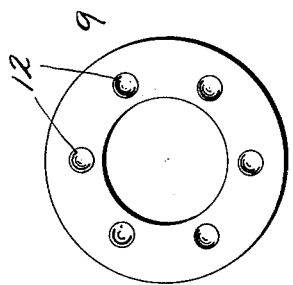
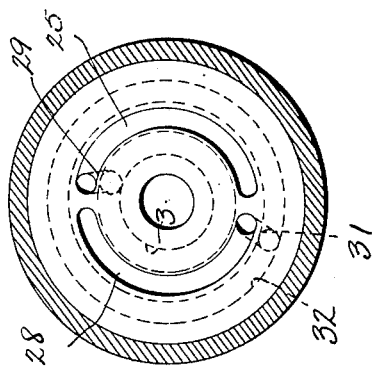
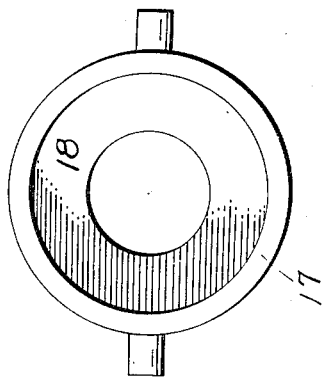
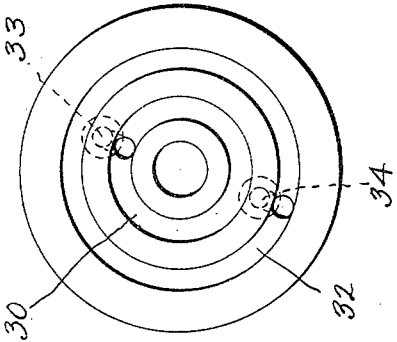
Inventor
Robert H. Dunlap.
E. W. Anderson Jr
By
Attorney April 14, 1925.
R. H. DUNLAP
1,533,399
MEANS FOR TRANSMITTING POWER
Filed Feb. 6, 1920
3 Sheets-Sheet 3

INVENTOR
Robert H. Dunlap
by E. W. Anderson
Attorney

Patented Apr. 14, 1925.

1,533,399

UNITED STATES PATENT OFFICE.

ROBERT H. DUNLAP, OF WASHINGTON, DISTRICT OF COLUMBIA.

MEANS FOR TRANSMITTING POWER.

Application filed February 6, 1920. Serial No. 356,692.

*To all whom it may concern:*

Be it known that I, ROBERT HENRY DUNLAP, a citizen of the United States, resident of Washington, in the District of Columbia, have made a certain new and useful invention in Means for Transmitting Power; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to variable speed mechanism, having for its object to provide a clutch including transmission and speed controlling means operating through a fluid medium and wherein there will be no operation of the controlling means when full speed is transmitted and wherein the controlling means will be operated in a decreasing ratio as full speed is approached, the operation of the controlling means being reliable and accurate for any speed adjustment irrespective of the load. Another object is to provide improved transmission means capable of an infinite number of speed variations between zero and the maximum speed, and wherein there will be no shock or vibration in changing from one speed to another. Other objects and advantages will appear.

The invention consists in the novel construction and combinations of parts as hereinafter set forth.

Figure 1:
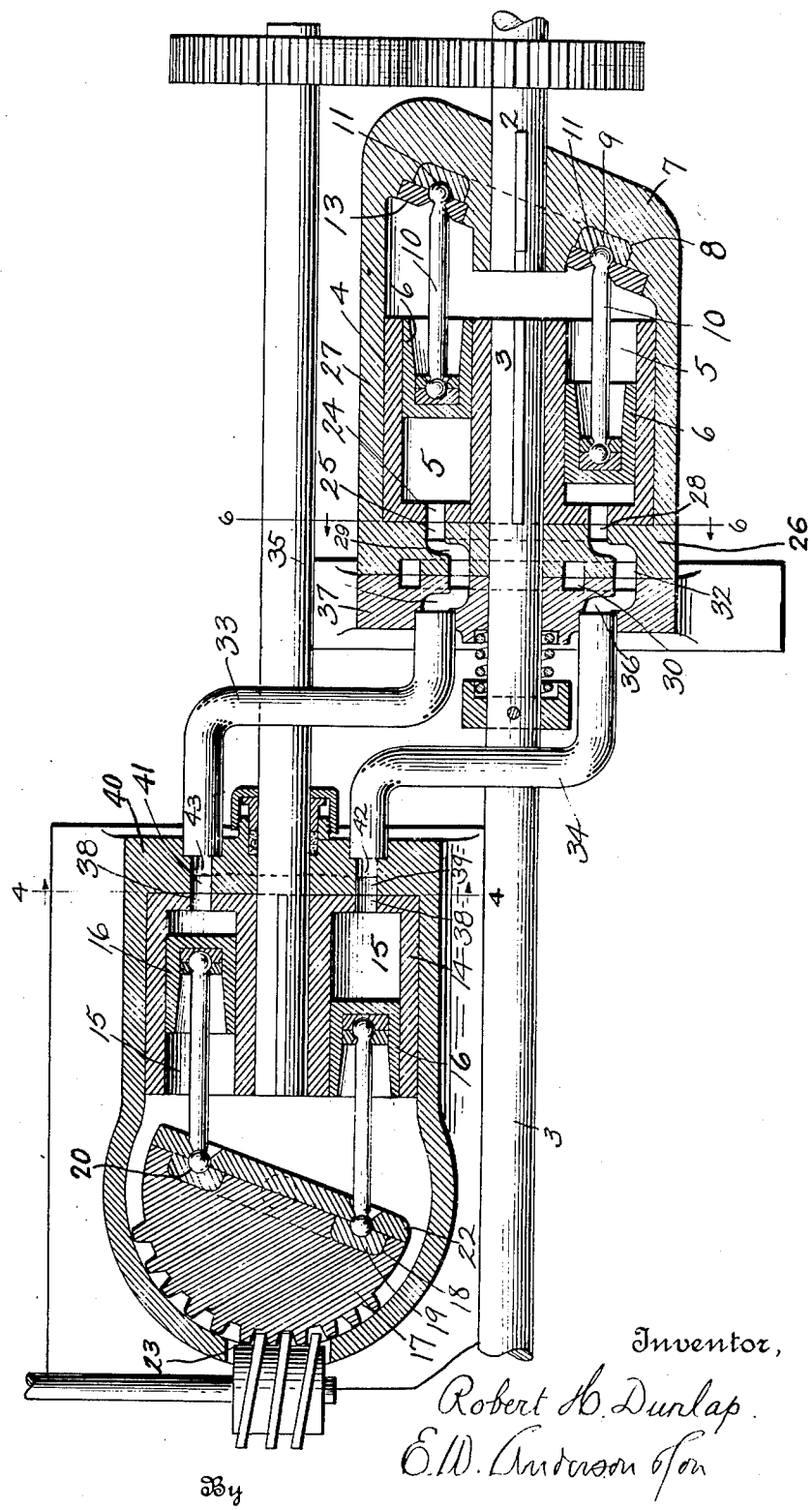
Figure 8:
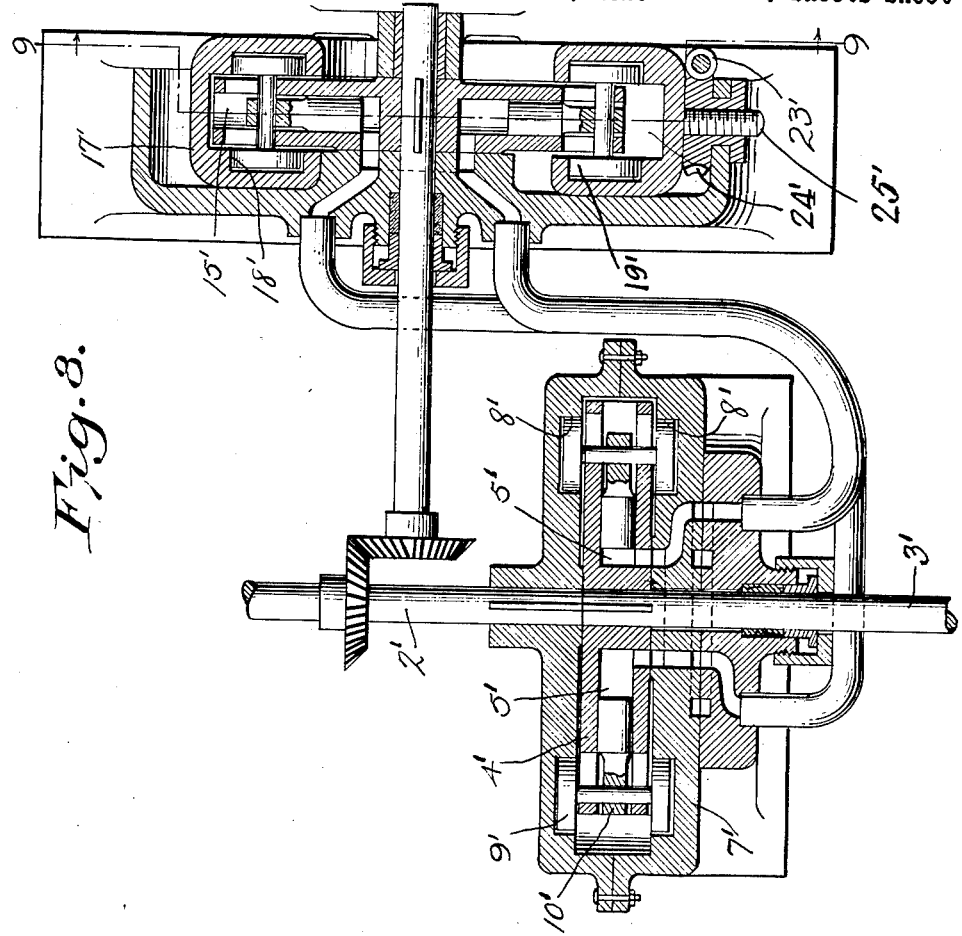
Figure 9:
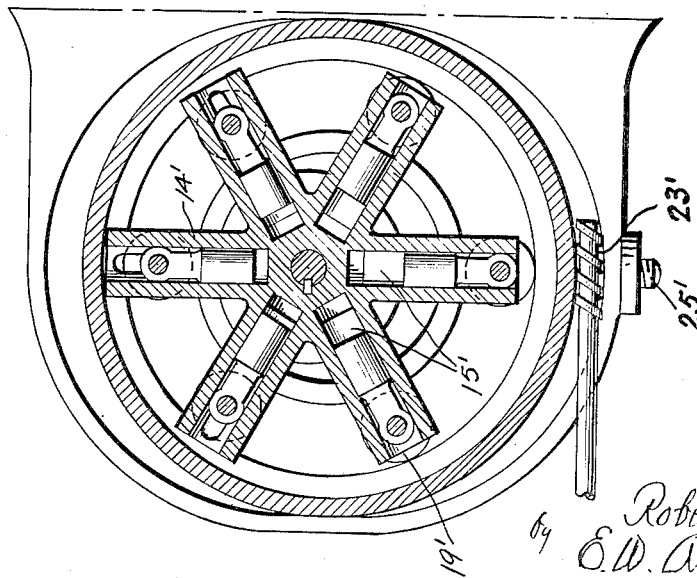

In the accompanying drawings illustrating an embodiment of the invention, Figure 1 is a longitudinal sectional view of the preferred form of the invention; Figure 2 is a face view of the stationary member of the controlling unit; Figure 3 is a similar view of the annulus of the transmission unit, the annulus of the controlling unit being identical; Figure 4 is a section on the line 4—4, Figure 1; Figure 5 is a face view of the channeled head of the transmission unit; Figure 6 is a section on the line 6—6, Figure 1; Figure 7 is an end view of the barrel of the transmission unit, the barrel of the controlling unit being identical; Figure 8 is a central sectional view of a modified form of the invention, and Figure 9 is a section on the line 9—9, Figure 8. In these drawings the numeral 2 designates the drive shaft, and 3 the driven shaft, a differentially acting power transmitting unit or pump being interposed therebetween, the differential action, in the example herein disclosed, comprising rotary and alternative reciprocatory motions. The pump consists of a member or barrel 4, fast on the driven shaft and having a plurality of cylinders 5, and oppositely acting elements or pistons 6 located respectively in said cylinders; a swash plate 7 fast on the drive shaft, and having an inclined groove 8 therein, and an annulus 9, fitting in the groove and capable of movement therein rotatively, the piston rods 10, having ball ends 11 pivotally engaging spaced seats 12 of said annulus, an outer ring 13 serving to hold the ball ends of said rods in said seat.

The cylinders 5 of said pistons are connected by fluid operating means including a speed controlling unit or pump, having a member or barrel 14 geared to or otherwise driven by shaft 2 and provided with a plurality of cylinders 15, pistons 16 in said cylinders; and a fixed swash plate 17 adapted to operate said pistons and adjustable to vary their throw; two conduits 33 and 34 connecting the cylinders of the transmission and controlling units or pumps as hereinafter more particularly stated, and a body of fluid being located in said conduits and in the cylinders of both units or pumps. The swash plate 17 is provided with an annular groove 18 in one face thereof an annulus 19 being located and capable of movement rotatively therein, the annulus having spaced seats 20 and the piston rods having ball ends, pivotally engaging said seats, an outer securing ring 22 being used to hold the ball ends in the seats and the annulus 19 in groove 18. Member 17 is adapted to be secured in inclined position to transmit reciprocatory movement to the pistons 16 during their rotation with barrel 14.

Any suitable adjusting device to vary the inclination of the swash plate 17, may be used, as for instance a worm gear connection 23.

Each cylinder of the first-named pump has at its inner end a port 24, and during each rotation of the barrel 4, each said cylinder has during one half of said rotation communication with a semi-circular passage 25, of a member or head 26, fast upon the drive shaft, usually through a shell connection 27, with the inclined swash plate 7; and during the complementary or other half of said rotation communication with a semi-circular passage 28 of the head 26, the passage 25, having at 29 connection with an inner annular passage or channel 30, and the passage 28 having at 31, connection with an outer annular passage or channel 32. The conduit 33 is connected at one end by port 35 of support 37 with the inner annular passage 30, and the conduit 34 by port 36 of support 37 with the outer annular passage 32, through the medium of a stationary member or support 37. These annular passages are shown as formed partly in the head 26 and partly in the support 37, but may be omitted from either member. The semi-circular and annular passages 25, 28, 30 and 32 are subsidiary to and form a part of the conduits 33 and 34.

Each cylinder of the speed controlling unit or pump has at its inner end a port 38, and during each rotation of the barrel 14, each said cylinder has during one-half of said rotation communication with a semi-circular passage 39, of a stationary member or support 40, and during the complementary or other half rotation of said barrel, communication with a semi-circular passage 41 of said support, the passage 39 having by port 42, connection with the conduit 34, and the passage 41, having by port 43, connection with the conduit 33. The semi-circular passages 39 and 41 are also subsidiary to and form part of the conduits 33 and 34.

The members 7 and 26 of the transmission unit or pump, and the members 17 and 40 of the controlling unit or pump are so arranged that the change from forcing to suction stroke of the pistons of said pumps will synchronize with the change of port connection of the respective related cylinders from one conduit to the other. That is to say communication will be established between a cylinder of the transmission unit during the forcing action of the piston thereof and a cylinder of the controlling unit during the sucking action of the piston thereof through one of the conduits 33 or 34, and between the said cylinders of the two pumps during the opposite action of the pistons thereof, through the other of said conduits.

The swash plate 17 being adjusted to the inclination shown in Figure 1 similar to the inclination of the swash plate 7, the driven shaft will have no rotative movement imparted thereto from the driving shaft. In this adjustment, the barrel 14 rotating with the drive shaft will carry the pistons 16 around therewith, and these pistons being set to pump to the maximum degree, will be thrown in and out, or forward and back, to pump the fluid contained in the cylinders of both pumps and in the conduits 33 and 34, the action of the cylinders 15 of the rotating barrel 14 being to receive and separate a charge of fluid from one of said conduits and transfer said charge to the other conduit. In this operation, the pistons 16 will act successively to pump said fluid into the semi-circular passage 39, and therefrom into the conduit 34 during one half rotation of the barrel 14, all cylinders located around one half of the drive shaft being in communication with the passage 39 simultaneously. The fluid so pumped is delivered to the outer annular passage 32 by the pipe 34, and therefrom to the semi-circular passage 28, during the rotation of the head 26; and from said passage 28, the fluid is delivered to the cylinders 5, all cylinders 5 located around one half of the shaft 3 being in communication with passage 28 simultaneously. The pistons 6 of these cylinders will now move outwardly and be in suction, but as the head 26 moves further around rotatively, the cylinders 5 will come into registration successively with the semi-circular passage 25 of the head 26, all cylinders 5 located around one-half of the shaft 3 being in communication with passage 25, simultaneously; and the pistons 6 being now on the drive stroke will pump the fluid from passage 25 into the inner annular passage 30, and therefrom backwardly into the semi-circular passage 41, and therefrom into the cylinders 15 which have passed into communication with said passage in the rotation of the barrel 14. In the operation stated the swash plate 7 will move rotatively with relation to the ring 9, because of the load upon the shaft 3 resisting a rotary movement of said ring with said plate.

The pistons 6 are thereby caused to be reciprocated to the same extent or with the same stroke length as the pistons 16, owing to the inclination of the swash plate 7 being the same as that of the swash plate 17, and the fluid being pumped freely and without obstruction through the system, there will be no tendency to rotate and no rotation of the barrel 4 and of the driven shaft. The action of the transmission and controlling units as stated is purely a circulating action.

The opposite extreme is when the adjustable head 17 is moved so that it will lie at right angles to the drive shaft, and the pistons 16 will therefore have no reciprocatory movement imparted thereto by said head. In this adjustment there will be no movement of the fluid in the system, because the pressure set up by the pistons 6 will be resisted by the pistons 16, and the pistons 6, not being able to reciprocate in their cylinders, will be carried around bodily with the drive shaft, the ring 9 having no movement rotatively with relation to the swash plate 7, and the drive shaft. This bodily movement of the pistons 5 will carry therewith the barrel 4 and the driven shaft, which will be rotated at the same speed as the driven shaft.

The nearer the adjustable head 17 is moved from the inclination shown in Figure 1 to a position at right angles to the drive shaft, the less will be the length of stroke of the pistons 16, whereby in a given time or for a given movement of the drive shaft, the less will be the fluid pumped through the system, the result being that the pistons 6 of the transmission unit will be reciprocated more slowly (although their length of stroke will be always necessarily the same) and being reciprocated more slowly, there will necessarily be less movement rotatively of the ring 9 with relation to the swash plate 7, and the drive shaft, and necessarily also the pistons 6 and the barrel 4 will be carried around bodily with the drive shaft to a degree that will increase as the movement of rotation of the ring 9 with relation to the swash plate 7 decreases. In any adjustment of the swash plate 17 that does not result in the pistons 16 and 5 having the same length of stroke for an action of the transmission and controlling units that is purely a circulating action; or result in the pistons 16 and 5 having no movement or stroke; the action of the transmission and the controlling units will be partly a pumping action of the fluid, and partly through variation of the speed of movement of the fluid, a rotating action to establish a torque between the driving and the driven shafts. The controlling unit or pump being adapted to receive and separate a charge of fluid from one conduit and transfer said charge to the other conduit, the movement of the fluid from one conduit to the other is positively controlled and regulated, irrespective of the load.

An alternative form of the invention is illustrated in Figures 8 and 9 of the drawings, wherein the axes of cylinders 5' of the barrel 4' are arranged at right-angles to the driven shaft 3', the piston rods 10' having anti-friction rollers 9', adapted to engage opposed cam tracks 8' of the head 7', fast on the drive shaft 2'.

In the speed controlling pump of this form of the invention the axes of cylinders 15' of the barrel 14' are also arranged at right-angles to their shaft, geared to the drive shaft, the piston rods having anti-friction rollers 19', adapted to engage opposed tracks 18' of the adjustable member 17'. The member 17' may be adjusted in stationary bearings into or out of concentric relation to the barrel 14', by means of worm 23', gear 24' and threaded stem 25' of said member or other suitable means.

The channels and conduits in this form are identical with those of the form first described, and the action of the cam tracks upon the pistons of the pumps is also the same.

I claim:—

1. In means for transmitting power, a drive shaft, a driven shaft, and a variable speed fluid clutch therebetween, comprising a differential power transmission unit having cylinders and oppositely working pistons, and means connecting said cylinders and including a speed controlling unit, two conduits and a body of fluid contained in said conduits and in both units, said controlling unit being adapted to receive and separate a charge of fluid from one of said conduits and transfer said charge to the other conduit, and including a member having cylinders and pistons and a member adapted to differentially operate the pistons and adjustable to vary the throw of the pistons to vary the velocity of the fluid and thereby to vary inversely the speed of the movement transmitted, one member being stationary and the other fast on the drive shaft.

2. In means for transmitting power, a drive shaft, a driven shaft, and a variable speed fluid clutch therebetween, comprising a power transmission unit including a member fast on the driven shaft and having cylinders and pistons, and a member fast on the drive shaft and adapted to differentially operate said pistons, and means connecting the cylinders and including a speed controlling unit, two conduits, and a body of fluid contained in said conduits and in both units, said controlling unit being adapted to receive and separate a charge of fluid from one of said conduits and transfer said charge to the other conduit and including a member having cylinders and pistons and a member adapted to differentially operate the pistons and adjustable to vary the throw of the pistons to vary the velocity of the fluid and thereby to vary inversely the speed of the movement transmitted, one member being stationary and the other fast on the drive shaft.

3. In means for transmitting power, a drive shaft, a driven shaft, and a variable speed fluid clutch therebetween, comprising a power transmission unit including a member fast on the driven shaft and having cylinders and pistons and a member fast on the drive shaft and adapted to differentially operate the pistons, and means connecting the cylinders and including a speed controlling unit, two conduits, and a body of fluid contained in said conduits and in both units, said controlling unit being adapted to receive and separate a charge of fluid from one of said conduits and transfer said charge to the other conduit and including a member fast on the drive shaft and having cylinders and pistons and a stationary member adapted to differentially operate the pistons and adjustable to vary the throw of the pistons to vary the velocity of the fluid and thereby to vary inversely the speed of the movement transmitted, the transmission unit having a stationary valve device provided with two annular passages having each a port and a valve device moving in unison with the piston operating member and having two semicircular passages provided each with a port communicating with the ports of said annular passages, and the cylinders of the transmission unit having each a port communicating intermittently with the ports of said semi-circular passages, the conduits communicating respectively with the respective ports of said annular passages, the controlling unit having a stationary valve device provided with semi-circular passages having ports communicating respectively with the respective conduits, and the cylinders thereof having each a port communicating intermittently with the ports of the last-named semi-circular passages.

4. In means for transmitting power, a drive shaft, a driven shaft, and a variable speed fluid clutch therebetween, comprising a power transmission unit having a member provided with cylinders and pistons and a member adapted to operate the pistons differentially, one of the members being fast on the drive and the other fast on the driven shaft, and means connecting the cylinders and including a speed controlling unit having a member provided with cylinders and pistons and a member adapted to operate the pistons differentially, one member being fast on the drive shaft and the other member being stationary, two conduits, and a body of fluid contained in said conduits and in both units, the transmission unit and the controlling unit having respectively means for establishing communication between one of said conduits and a cylinder thereof during the stroke of the related piston in one direction and between the other conduit and said cylinder during the stroke of said piston in the opposite direction, said controlling unit being adapted to receive and separate a charge of fluid from one of said conduits and transfer said charge to the other conduit and including a member adjustable to vary the velocity of the fluid and thereby to vary inversely the speed of the movement transmitted.

5. In means for transmitting power, a drive shaft, a driven shaft, and a variable speed fluid clutch therebetween, comprising a power transmission unit having a member provided with cylinders and pistons and a member adapted to operate the pistons differentially, one of the members being fast on the drive and the other fast on the driven shaft, and means connecting the cylinders and including a speed controlling unit having a member provided with cylinders and pistons and a member adapted to operate the pistons differentially, one member being fast on the drive shaft and the other member being stationary, two conduits, and a body of fluid contained in said conduits and in both units, the transmission unit and the controlling unit having means for establishing communication between a cylinder of the transmission unit during the forcing action of the related piston and a cylinder of the controlling unit during the sucking action of the related piston through one of said conduits, and between the cylinders of the two units during the opposite action of the related piston through the other conduit, said controlling unit being adapted to receive and separate a charge of fluid from one of said conduits and transfer said charge to the other conduit and including a member adjustable to vary the velocity of the fluid and thereby to vary inversely the speed of the movement transmitted.

In testimony whereof I affix my signature in presence of two witnesses.

R. H. DUNLAP.

Witnesses:
HENRY M. MOMAN,
THELMA I. PAGE.